United States Patent [19]

Koitabashi

[11] Patent Number: 4,574,930
[45] Date of Patent: Mar. 11, 1986

[54] ELECTROMAGNETIC CLUTCH

[75] Inventor: Takatoshi Koitabashi, Annaka, Japan

[73] Assignee: Sanden Corporation, Japan

[21] Appl. No.: 521,555

[22] Filed: Aug. 9, 1983

[30] Foreign Application Priority Data

Aug. 9, 1982 [JP] Japan .......................... 57-119856[U]

[51] Int. Cl.$^4$ ............................................. F16D 27/07
[52] U.S. Cl. ................................ 192/84 C; 192/106.1;
192/70.17
[58] Field of Search ............... 123/84 C, 70.17, 70.18,
123/106.1

[56] References Cited

U.S. PATENT DOCUMENTS

| 3,565,223 | 2/1971 | Pierce | 192/106.1 |
| 3,754,624 | 8/1973 | Eldred | 192/106.1 |
| 3,939,951 | 2/1976 | Sink et al. | 192/70.18 |
| 4,305,198 | 12/1981 | Kanamaru et al. | 192/84 C |
| 4,353,450 | 10/1982 | Wakefield | 192/84 C |

FOREIGN PATENT DOCUMENTS

| 0122047 | 10/1978 | Japan | 192/84 C |
| 0109830 | 8/1980 | Japan | 192/84 C |
| 0012126 | 1/1982 | Japan | 192/84 C |

Primary Examiner—Parshotam S. Lall
Attorney, Agent, or Firm—Banner, Birch, McKie & Beckett

[57] ABSTRACT

An electromagnetic clutch is disclosed which includes a pulley and an electromagnetic coil. A hub is secured to a drive shaft and has a radially extending flange portion which faces the pulley at a predetermined axial gap. An armature plate is disposed in the axial gap between the pulley and the radially extending flange portion of hub. The armature plate is elastically connected to the flange portion of the hub by a plurality of U-shaped spring members. Each spring member is provided with a pair of fittings and a pair of spaced, opposing axial flanges extending from the end portion of the fittings. An elastic member is located in the gap between the axial flanges. The impact force on the drive shaft when the electromagnetic clutch is first actuated is reduced by the compressive deformation of the elastic members. The impact sound is also reduced by the twist deformation of the elastic members.

5 Claims, 8 Drawing Figures

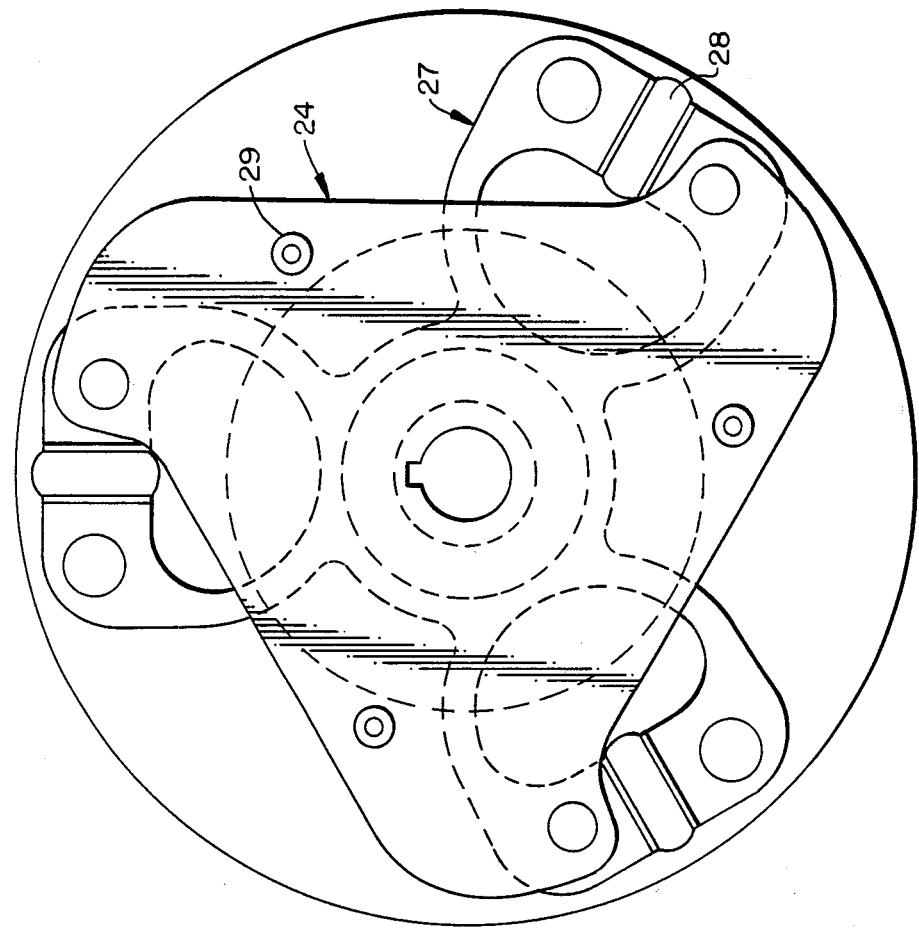
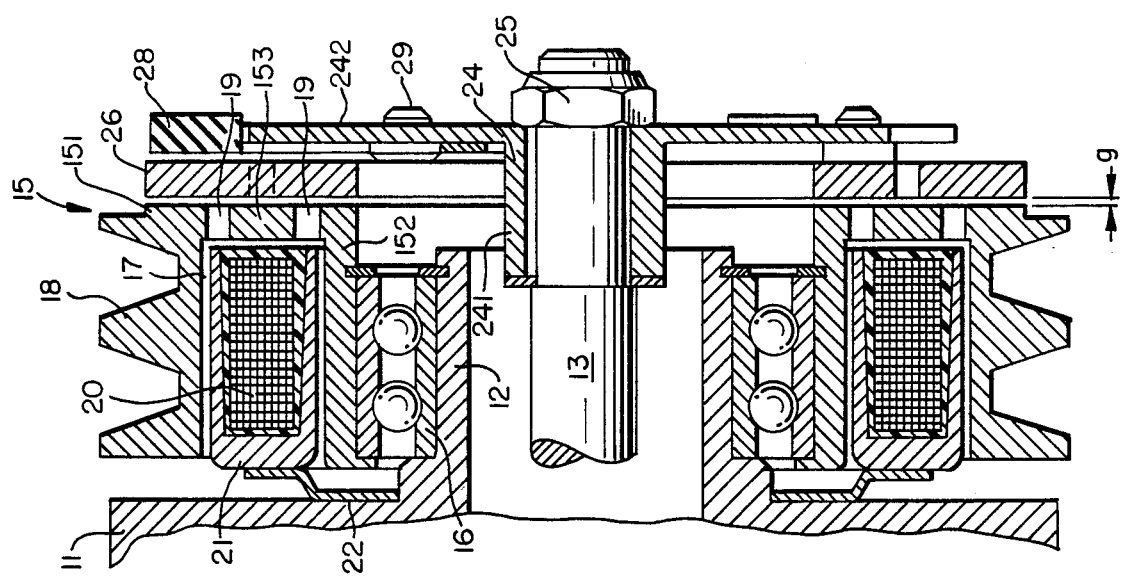

ELECTROMAGNETIC CLUTCH

TECHNICAL FIELD

This invention relates generally to electromagnetic clutches, such as for use in controlling the transmission of power from an automobile engine to a refrigerant compressor in an automobile air conditioning system, and more particularly, to an improved connecting structure between an armature plate and a hub mounted on a compressor shaft for transferring the rotation of a pulley to the compressor shaft.

BACKGROUND OF THE INVENTION

The general structure of the electromagnetic clutch for use between an automobile engine and refrigerant compressor is disclosed in U.S. Pat. Nos. 3,044,594 and 3,082,933. The electromagnetic clutch disclosed in these patents, which is illustrated in FIG. 1 of the annexed drawings, comprises a pulley 1 rotatably supported on a tubular extension of a compressor housing through a bearing 2. The pulley is rotated by a belt coupled to the automobile engine. Pulley 1 is made from a magnetic material in which one or more concentric arcuate or annular slits 3 are formed to define a plurality of concentric annular magnetic pole pieces. Drive shaft 4 extends through a tubular extension in the compressor housing and a hub 5 is fixed to the terminal end of the drive shaft 4. An annular armature plate 6 is joined by a plurality of leaf springs 7 to hub 5 in such a fashion that armature plate 6 faces the annular concentric pole pieces with an axial air gap therebetween. A magnetic coil 8 is mounted on the tubular extension of the housing to generate magnetic flux to attract armature plate 6 to the magnetic pole pieces. Thus, when magnetic coil 8 is energized and the engine is driving pulley 1, drive shaft 4 rotates together with pulley 1. However, when magnetic coil 8 is not energized, even though pulley 1 is rotated by the engine, drive shaft 4 of the compressor is not driven.

In the above prior art construction, armature plate 6 is joined to hub 5 by a plurality of leaf springs 7 and, hub 5 is fixed to drive shaft 4. At the moment when armature plate 6 is energized, it impacts against the pulley 1, and an impact sound is caused because the two parts are formed of metal. This impact sound is very annoying to passengers within the automobile.

The impact force between armature plate 6 and pulley 1 occurs at the moment when the armature plate connects with the axial end surface of the pulley and the pulley begins to suddenly transmit rotational force. However, this impact force is not cushioned by the rigid connection of the leaf springs between the armature plate and the drive shaft. The sudden torque change is thus transmitted to the drive shaft of the compressor. The leaf springs are disposed at an angular offset to be drawn or pulled generally along their lengthwise dimension in the direction of the rotation. Therefore, if the clutch is rotated in a direction opposite to the normal direction of rotation, shearing stress is created in the leaf spring and the endurance of the clutch is therefore reduced.

Referring to another prior art design as shown in FIG. 2, a holder plate 9 is fixed, such as by rivets or other fastening means, on the opposite axial end surface of armature plate 6 than that which faces pulley 1. An inner end portion of holder plate 9 and outer end portion of hub 5 are formed with concentric annular axial flanges 91 and 51, and a rubber member 10 is disposed in the clearance between axial flanges 91 and 51. Therefore, armature plate 6 is connected to hub 5 through holder plate 9 and rubber member 10. The transmission of sudden torque changes to the drive shaft is thus eased by the rubber member. However, easing of the impact force is dependent on inducing of bending stress and/or shearing stress in the rubber member. Therefore, the rubber member fatigues by the repeated intermittent operation of the clutch and the rubber member becomes cracked or destroyed.

SUMMARY OF THE INVENTION

It is a primary object of this invention to provide an electromagnetic clutch which has a mechanism for reducing the impact force transmitted to the drive shaft upon initiation of rotational movement of the drive shaft.

It is another object of this invention to provide an electromagnetic clutch with improved durability of an elastic member which connects the drive shaft to the clutch for transmitting the rotation.

It is still another object of this invention to provide an electromagnetic clutch which reduces impact noise of the armature against the pulley.

An electromagnetic clutch according to this invention includes a first rotatable member having an axial end plate of magnetic material and a second rotatable member. The second rotatable member includes a rotatable shaft, a hub mounted on the end of the shaft, and a radially extending flange portion mounted on the hub which faces the axial end plate of the first rotatable member at a predetermined axial gap. An annular armature plate is disposed in the axial gap between the first rotatable member and the flange portion mounted on the hub. The armature plate faces the axial end plate of the first rotatable member with an axial air gap therebetween. An electromagnetic means is disposed within the first rotatable member for attracting the armature plate to the axial end plate of the first rotatable member.

The armature plate is elastically connected with the flange portion of the second rotatable member by a plurality of U-shaped leaf springs. Each leaf spring is provided with a pair of fittings at each end thereof and has an axial flange extending along the end portion of the fittings. The pair of axial flanges are opposed to one another with a radial gap therebetween. An elastical member is disposed in the radial gap of the axial flanges. Accordingly, the impact force is reduced by the compressive deformation of the elastical member.

Further objects, features and other aspects of this invention will be understood from the following detailed description of the preferred embodiment of this invention referring to the annexed drawings.

BRIEF DESCRIPTION OF THE DRAWINGS

FIG. 3 is a vertical sectional view of an electromagnetic clutch according to one embodiment of this invention.

FIG. 6 is a front end view of an electromagnetic clutch according to another embodiment of this invention.

DETAILED DESCRIPTION OF THE PREFERRED EMBODIMENT

Figure 1:
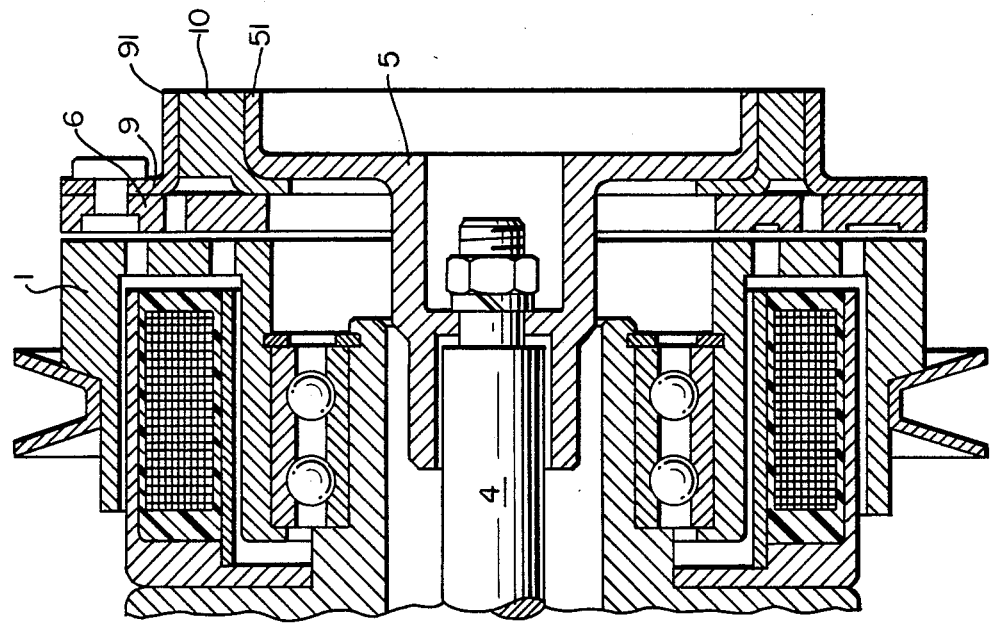
FIG. 1 is a vertical sectional view of a conventional electromagnetic clutch.
Figure 2:
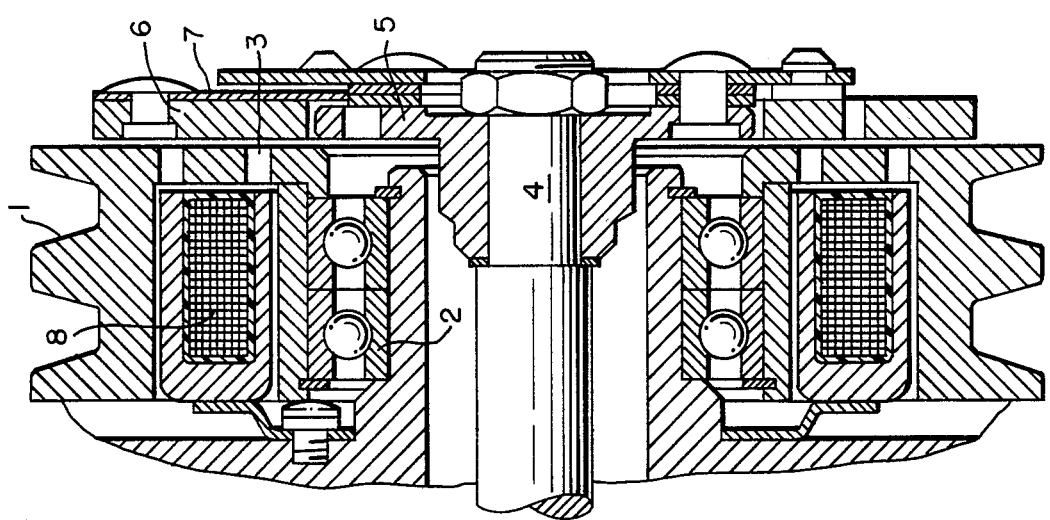
FIG. 2 is a vertical sectional view of another conventional electromagnetic clutch.
Figure 4:
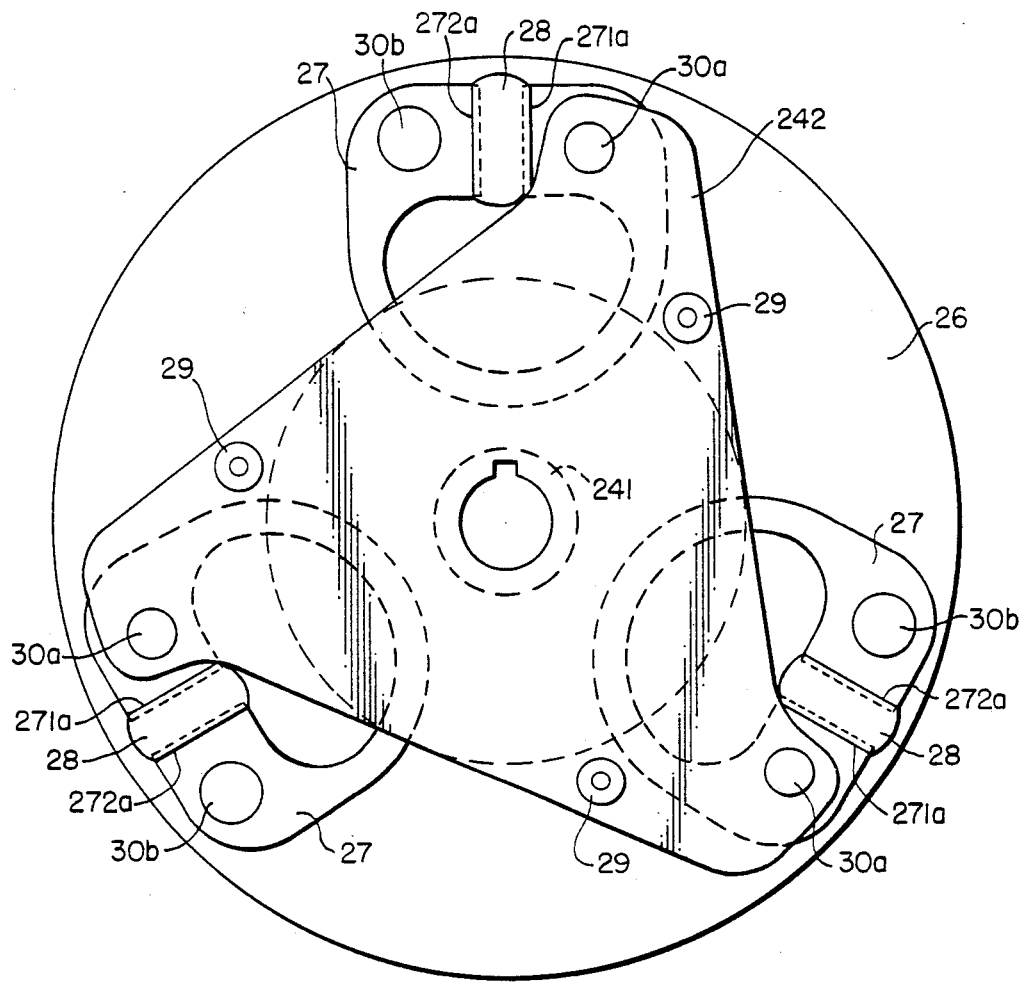
FIG. 4 is a front end view of the electromagnetic clutch shown in FIG. 3.
Figure 5:
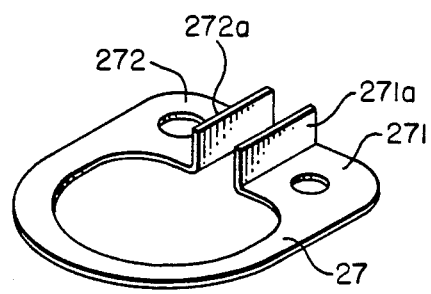
FIG. 5 is a schematic view of a leaf spring according to the embodiment of FIG. 3.

Referring to FIGS. 3-5, an electromagnetic clutch according to an embodiment of this invention is illustrated. The clutch is intended to be connected to a refrigerant compressor for an automobile air conditioner. A compressor housing 11 is provided with a cantilevered tubular extension 12 surrounding an extension of a drive shaft 13 of the compressor. Drive shaft 13 is rotatably supported in the compressor housing 11 by bearings.

A pulley 15 is rotatably supported on tubular extension 12 through a bearing 16 which is mounted on the outer surface of tubular extension 12. Pulley 15 is made of magnetic material, such as steel, and includes an outer annular cylindrical portion 151, an inner annular cylindrical portion 152 and an axial end plate portion 153 connecting outer and inner cylindrical portions 151 and 152 at an axial forward end. An annular U-shaped cavity 17 is defined between the portions 151, 152 and 153 and an annular V-shaped groove 18 is provided on the outer peripheral surface of outer cylindrical portion 151 of pulley 15 for receiving a V-belt for coupling the compressor to the output shaft of the automobile engine (not shown).

Axial end plate portion 153 includes one or more concentric slits 19 which are disposed on one or more concentric circles. These slits 19 define a plurality of annular or arcuate magnetic pieces with the surface of the poles being on the axial end surface of axial end plate portion 153.

An electromagnetic coil 20 is disposed in an annular cavity 17 of pulley 15. Coil 20 is contained within an annular magnetic housing 21 having a U-shaped cross section. Housing 21 is fixed to a supporting plate 22, which is secured to the axial end surface of compressor housing 11 by a plurality of rivets (not shown). A small gap is maintained between coil housing 21 and pulley 15.

A hub 24 is disposed on a terminal end of drive shaft 13 within the housing. Hub 24 is secured to drive shaft 13 by a nut 25. The hub comprises tubular member 241 secured on the terminal end of drive shaft 13 and radial flange portion 242 extending radially outwardly from the axial end portion of tubular member 241. Radial flange portion 242 of hub 24 faces the axial end plate portion 153 of pulley 15 at a predetermined axial gap. As shown in FIG. 3, flange portion 242 is formed integral with tubular member 241. Alternatively, the flange portion may be formed separately from the tubular member and fixed on the tubular member by, for example, welding.

A ring plate or armature plate 26, which is concentric with hub 24, is disposed in the axial gap between end plate portion 153 of pulley 15 and radial flange portion 242. Armature plate 26, which faces the axial end plate portion 153 of pulley 15 at a predetermined axial gap, g, shown in FIG. 3, is elastically connected to flange portion 242 of hub 24 through a plurality of U-shaped spring members 27.

Referring to FIGS. 4 and 5, each U-shaped spring member 27 is provided with a pair of fittings 271 and 272. One of the fittings 271 is fixed to radial flange portion 242 of hub 24 by rivet 30a and other fitting 272 is fixed to an axial end surface of armature plate 26 by rivet 30b. Spring member 27 is also provided with axial flanges 271a, 272a axially projecting along the end portion of each fitting 271, 272, i.e., at the terminal extremities of the spring members. Flanges 271a and 272a are opposed to one another but separated by a radial space or gap. A rubber member 28 is fixed within the radial gap.

A plurality of elastic elements 29 are fixed to the axial end surface of radial flange portion 242. Elastic elements 29 push armature plate 26 toward axial end plate portion 153 of pulley 15 due to their elasticity and provide an initial deformation, or bias, to spring member 27. This deformation defines the predetermined axial gap g between pulley 15 and armature plate 26.

In the above construction, if coil 20 is not energized, armature plate 26 is separated from pulley 15 by the recoil strength of spring members 27 which maintain the predetermined gap. Thus, when coil 20 is not energized, only pulley 15 is driven by the engine of the automobile through the V-belt, and the compressor does not operate. On the other hand, when coil 20 is energized, magnetic flux is induced and flows through a closed loop comprising coil housing 21, pulley 15, armature plate 26, and coil housing 21. Armature plate 26 is magnetically attracted to pulley 15 by the magnetic flux and spring 27 and rubber member 28 are bent in the axial direction. Therefore, the rotating movement of the automobile engine is transmitted to drive shaft 13 of the compressor through pulley 15, armature plate 26, spring members 27, rubber member 28 and hub 24.

At the moment armature plate 26 contacts axial end plate portion 153 of pulley 15, rubber member 28 receives the impact force caused by the torque of armature plate 26. This impact force is reduced by the compressive deformation of rubber member 28 in the direction of rotating movement of armature plate 26. Thus, the sudden torque change which is transmitted to drive shaft 13 is reduced by the compressive deformation of rubber member 28. Also, during the attraction of armature plate 26, spring member 27 is axially deflected and rubber member 28 is subject to a twist deformation. This twist deformation serves to reduce the impact sound caused at the moment the armature plate 26 is attached against pulley 15.

FIG. 6 illustrates a modified structure of the embodiment shown in FIGS. 3-5. In this embodiment, a plurality of U-shaped spring members 27 are formed integrally with one another to facilitate assembly of the spring member.

Figure 7:
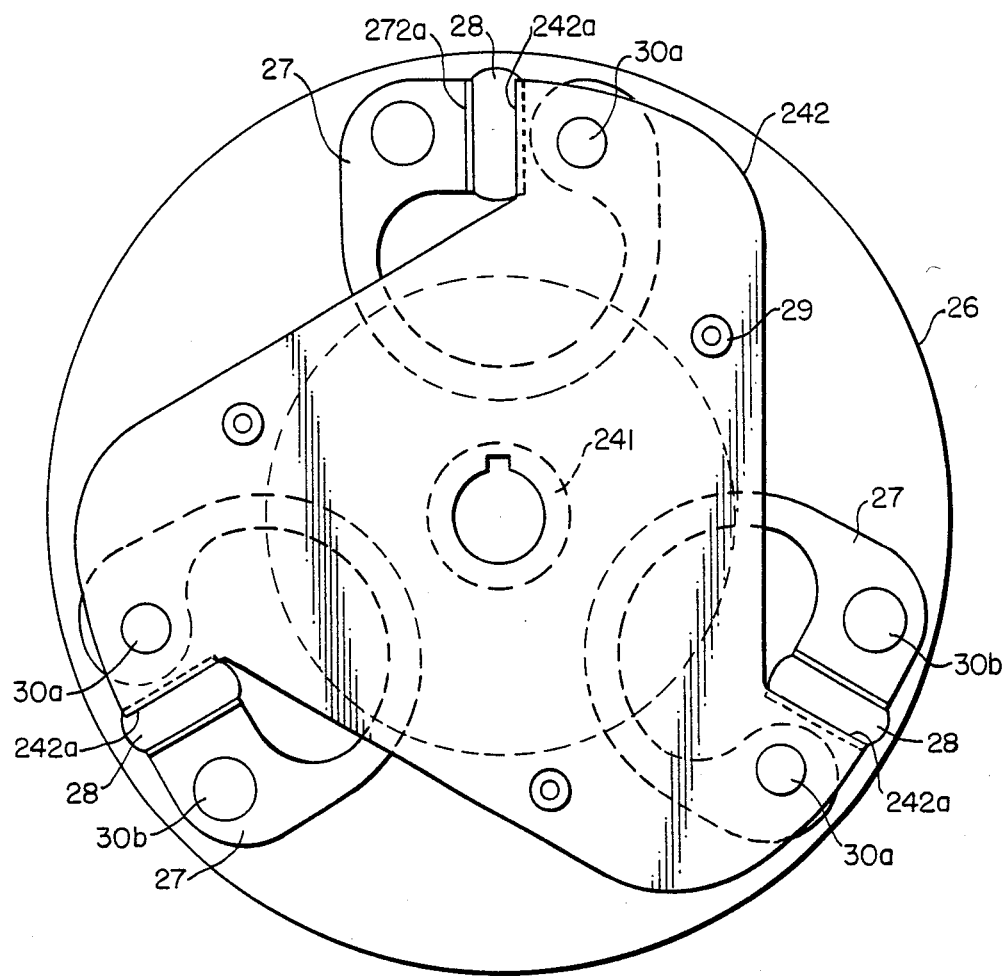
FIG. 7 is a front end view of an electromagnetic clutch according to another embodiment of this invention.
Figure 8:
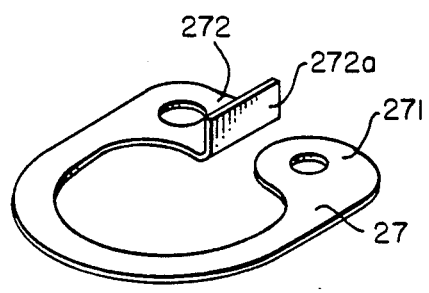
FIG. 8 is a schematic view of a leaf spring according to the embodiment of FIG. 6.

Referring to FIGS. 7 and 8, another embodiment of an electromagnetic clutch in accordance with the present invention is shown. This embodiment modifies the structure of the flange portion of the spring member.

In FIGS. 7 and 8, similar parts are represented by the same reference numerals as the embodiment shown in FIGS. 3-5 and the detailed description of the similar parts will be omitted in order to simplify the description.

Each U-shaped spring member 27 is provided with a pair of fitting portions 271 and 272. One of fittings 271 is fixed on an axial end of radial flange portion 242 of hub 24 by rivet 30a and other fittings 272 is fixed on axial end of armature plate 26 by rivet 30b. The end portion of fitting 272 has an axial flange 272a and the end portion of radial flange portion 242 opposed to axial flange 272 a is formed with an axial flange 242a. Axial flanges 272a and 242a are opposed to one another and separated by a radial gap. A rubber member 28 is fixed within the radial gap.

According to this invention, the impact force which is transmitted to shaft 13 of the compressor through pulley 15 is reduced principally by compressive deformation of rubber member 28 which is located in either an axial gap between axial flanges of spring member 27 or between an axial flange of spring member 27 and an axial flange portion 242a of radial flange 242 of hub 24. Also, the impact sound which is caused by the impact of pulley 15 and armature plate 26, is reduced by the twist deformation of rubber member 28. Furthermore, excessive deformation of spring member 27 is prevented by rubber member 28 to thereby prevent fatigue and fracture of the spring members.

This invention has been described in detail in connection with preferred embodiments, but the preferred embodiments are an example only and this invention is not restricted thereto. It will be easily understood by those skilled in the art that other variations and modifications can be easily made within the scope of the invention, which is defined by the following claims.

I claim:

1. In an electromagnetic clutch including a first rotatable member having an axial end plate of magnetic material, a second rotatable member, an annular armature plate of magnetic material joined to said second rotatable member so that said annular armature plate is capable of limited axial movement, said annular armature plate facing said axial end plate of said first rotatable member with an axial gap therebetween, and an electromagnetic means associated with said axial end plate for attracting said armature plate to said axial end plate so that rotation of said first rotatable member can be transmitted to said second rotatable member through said armature plate by the operation of said electromagnetic means, the improvement wherein:
   said second rotatable member includes a drive shaft, and a hub fastened to said drive shaft;
   said hub having an axially extending tubular member and a radially extending flange extending from said tubular member;
   a plurality of U-shaped spring members coupling said radially extending flange to said armature plate;
   a pair of opposing, spaced axial flanges disposed at each of said spring members; and
   an elastic member fixed in the space between each pair of said opposed axial flanges so that force transferred to said drive shaft through said first rotatable member is reduced by compressive and twist deformation of said elastic member.

2. The electromagnetic clutch of claim 1 wherein said axial flanges are formed on the terminal extremities of said U-shaped spring members.

3. The electromagnetic clutch of claim 1 wherein one of each pair of said axial flanges extends from said spring members and the other of each pair of said axial flanges extends from said radially extending flange of said hub.

4. In an electromagnetic clutch including a first rotatable member having an axial end plate of magnetic material, a second rotatable member, an annular armature plate of magnetic material joined to said second rotatable member so that said annular armature plate facing said axial end plate of said first rotatable member with an axial gap therebetween, and an electromagnetic means associated with said axial end plate for attracting said armature plate to said axial end plate so that rotation of said rotatable member can be transmitted to said second rotatable member through said armature plate by the operation of said electromagnetic means, the improvement wherein:
   said second rotatable member includes a drive shaft, and a hub fastened to said drive shaft;
   said hub having an axially extending tubular member and a radially extending flange extending from said tubular member;
   a plurality of U-shaped spring members coupling said radially extending flange to said armature plate, each of said spring members having opposing, spaced axial flanges; and
   an elastic member fixed in the space between each pair of said opposed axial flanges so that force transferred to said drive shaft through said first rotatable member is reduced by compressive and twist deformation of said elastic member.

5. In an electromagnetic clutch including a first rotatable member having an axial end plate of magnetic material, a second rotatable member, an annular armature plate of magnetic material joined to said second rotatable member so that said annular armature plate is capable of limited axial movement, said annular armature plate facing said axial end plate of said first rotatable member with an axial gap therebetween, and an electromagnetic means associated with said axial end plate for attracting said armature plate to said axial end plate so that rotation of said first rotatable member can be transmitted to said second rotatable member through said armature plate by the operation of said electromagnetic means, the improvement wherein:
   said second rotatable member includes a drive shaft, and a hub fastened to said drive shaft;
   said hub having an axially extending tubular member and a radially extending flange extending from said tubular member;
   a plurality of U-shaped spring members coupling said radially extending flange to said armature plate;
   a first axial flange formed on one end of each of said spring members;
   a plurality of second axial flanges formed on said radially extending flange of said hub, each of said second axial flanges positioned opposite and spaced from one of said first axial flanges; and
   an elastic member fixed in the space between each pair of said first and second axial flanges so that force transferred to said drive shaft through said first rotatable member is reduced by compressive and twist deformation of said elastic member.

* * * * *